Dec. 1, 1964  W. G. McCROSSEN  3,159,420
SCREEN-LINED TRUCK BODY
Filed Nov. 19, 1963
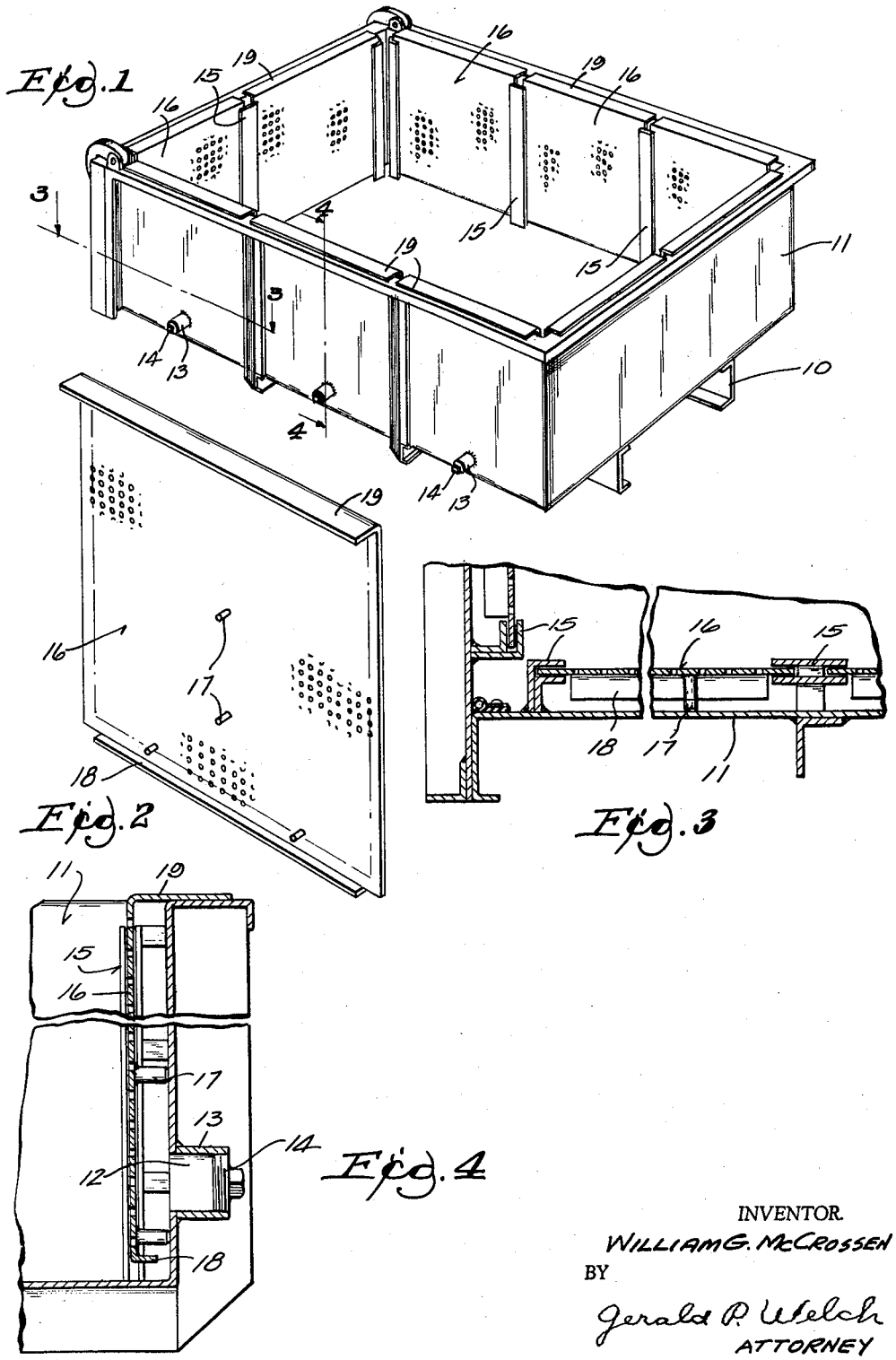
INVENTOR.
WILLIAM G. McCROSSEN
BY
Gerald P. Welch
ATTORNEY

3,159,420
SCREEN-LINED TRUCK BODY
William G. McCrossen, 6550 W. Forest Home Ave.,
Milwaukee 20, Wis.
Filed Nov. 19, 1963, Ser. No. 324,715
1 Claim. (Cl. 296—28)

This invention relates to improvements in screen-lined truck bodies, and more particularly to a novel screen-lined truck body adapted for the transportation of wet materials.

An object of the invention is to provide a device of the type which will permit the transport of wet materials in a truck body and will allow for draining of the moisture therefrom during transit and loading and unloading thereof.

Other and further objects of the invention will appear as the description proceeds, reference being had to the accompanying drawing, in which:

FIG. 1 is a view in perspective of a screen-lined truck body embodying the invention.

FIG. 2 is a view in perspective of one of the screen elements.

FIG. 3 is a sectional view taken on line 3—3 of FIG. 1.

FIG. 4 is a vertical sectional view partially broken away taken on line 4—4 of FIG. 1.

In the drawings, the numeral 10 represents the truck frame, carrying the truck box 11 which has a plurality of drain apertures as at 12, provided with external spouts 13 having the threaded closure members 14.

A plurality of vertical guide elements 15 are spaced interiorly of the truck box 11 to retain the screen elements 16 which are suitably perforated and are provided with spacer elements 17, a lower flange 18 and the top flange 19. The upper ledge 20 of the truck box 11 is used as a rest for the top flanges 19.

In use, with the screen elements 16 in place, the truck box 11 may be loaded with wet materials, which latter may be allowed to drain through the spouts 13. After the load has been discharged, the screens 16 may be individually removed for cleaning.

It will be understood that the device is capable of many modifications in structure and design, without departing from the spirit of the invention, within the scope of the appended claim.

Having thus described the invention, what is claimed and desired to be secured by Letters Patent of the United States, is:

In a screen lined truck body, a truck box having a plurality of drain apertures adjacent the bottom thereof, spouts exteriorly of said drain apertures, a plurality of vertical guides spaced on the interior vertical walls of said truck box, and a plurality of perforated elements received in said guides to form a screen lining spaced from the vertical walls of said truck box.

References Cited by the Examiner
UNITED STATES PATENTS

| 765,085 | 7/04 | Lanpher. | |
| 2,276,963 | 3/42 | Griffin | 280—5 |
| 2,622,887 | 12/52 | Prior | 280—5 |
| 2,724,597 | 11/55 | Fowler | 280—5 |

A. HARRY LEVY, *Primary Examiner.*